(12) United States Patent
Hummel, Jr.

(10) Patent No.: US 8,332,820 B2
(45) Date of Patent: Dec. 11, 2012

(54) AUTOMATED LOAD MODEL (75) Inventor: David M. Hummel, Jr., St. Charles, IL (US)

(73) Assignee: Accenture Global Services Limited, Dublin (IE)

(*) Notice: Subject to any disclaimer, the term of this patent is extended or adjusted under 35 U.S.C. 154(b) by 1077 days.

(21) Appl. No.: 12/261,519

(22) Filed: Oct. 30, 2008

(65) Prior Publication Data
US 2010/0115339 A1 May 6, 2010

(51) Int. Cl.
*G06F 9/44* (2006.01)
(52) U.S. Cl. ......................................... 717/124
(58) Field of Classification Search ............... 717/124
See application file for complete search history.

(56) References Cited

U.S. PATENT DOCUMENTS

| | | | |
|---|---|---|---|
| 5,136,529 A * | 8/1992 | Makie et al. .................. | 702/189 |
| 5,657,438 A * | 8/1997 | Wygodny et al. ............. | 717/124 |
| 7,516,042 B2 * | 4/2009 | Glas et al. .................... | 702/182 |
| 7,627,452 B2 * | 12/2009 | Albrecht et al. .............. | 702/182 |
| 2005/0107997 A1 * | 5/2005 | Watts et al. ................... | 703/21 |
| 2006/0248529 A1 * | 11/2006 | Loboz et al. .................. | 718/100 |
| 2007/0006162 A1 * | 1/2007 | Iho ................................ | 717/127 |
| 2008/0022159 A1 * | 1/2008 | Kato et al. .................... | 714/47 |
| 2008/0040707 A1 * | 2/2008 | Araki ............................ | 717/127 |
| 2008/0172581 A1 * | 7/2008 | Glas et al. .................... | 714/38 |
| 2009/0106600 A1 * | 4/2009 | Gross et al. .................. | 714/39 |
| 2009/0265681 A1 * | 10/2009 | Beto et al. .................... | 717/100 |
| 2010/0083049 A1 * | 4/2010 | Miki ............................. | 714/38 |

OTHER PUBLICATIONS

Steward, "Measuring Execution Time and Real-Time Performance", Sep. 2006, Embedded Systems Conference.*
Myers, "Scripting Graphical Applications by Demonstration", Apr. 18-23, 1998, Carneigie Mellon University.*

* cited by examiner

*Primary Examiner* — Wei Zhen
*Assistant Examiner* — Junchun Wu
(74) *Attorney, Agent, or Firm* — Fish & Richardson P.C.

(57) ABSTRACT

A method and system for testing a computer system is provided. In one implementation the method and system may include receiving a script footprint that includes dimension-effect values corresponding to the number of times a computer system dimension is affected by the script. Target information may also be received. The target information includes target dimension values corresponding to a desired number of times per time period each dimension should be affected. The method and system may determining the number of times to execute the scripts within the time period so as to minimize the difference between the actual number of times dimensions are affected and the target-dimension value per time period. The method and system may also execute the script on the computer system the determined number of times within the time period.

23 Claims, 7 Drawing Sheets

AUTOMATED LOAD MODEL

BACKGROUND

1. Field

The present embodiment relates to computer performance testing. More specifically, the present embodiment relates to a method and system for optimizing the testing of computers systems.

2. Background Information

As computer systems have evolved, so have the complexity of applications that operate on these systems. Oftentimes teams of developers create these complex applications and systems. Testing these systems becomes more and more difficult as the complexity increases. In some cases, applications and systems undergo alpha and beta testing. This typically involves allowing select groups of individuals to exercise various functions supported by the systems in an attempt to identify any deficiencies the systems may have.

A system characterized by large number of users may also undergo performance testing to assess the readiness or real world performance of the system. This involves determining whether the real world operation of the running system meets set expectations. To make this determination, the system under test should: 1) match or correlate directly to a production system being certified, 2) be monitored continuously throughout testing to determine whether the results meet or fail appropriate targets, and 3) be operating on a realistic workload which reflects real world usage. However, reaching this third requirement can be challenging.

SUMMARY OF INVENTION

To address the problems outlined above, a method and system for testing a computer system is provided. In one implementation, the method may receive a script footprint that includes dimension-effect values corresponding to the number of times a computer system dimension is affected by the script. A script corresponds to a code listing, executed by a processor that enables testing functionality associated with the computer system. A script footprint is a measure of the way in which a script affects the computer system as represented by the number of times per time period the script exercises operations of the computer system. A dimension corresponds to an operation performed by the computer system that a script may or may not exercise. For example, an authentication server may perform operations such as identity authentication, alternate identity authentication, password updating, group authentication, and/or operations for setting privileges with the system. Target information may also be received. The target information includes target dimension values corresponding to a desired number of times per time period each dimension should be affected. The method and system may determine the number of times to execute the scripts within the time period, so as to minimize the difference between the actual number of times dimensions are affected and the target-dimension during the time period. The method and system may also execute the script on the computer system the determined number of times within the time period.

In one aspect of the present invention, the differences between the actual number of times dimensions are affected, and the target-dimension values, are minimized via a linear-least-squares algorithm.

In another aspect of the present invention, a weighting factor may be applied to the dimension-effect values and the target-dimension values, so as to define the relative importance of the metrics and/or to even out the effects of different scaled metrics. The weighting factor may correspond to the reciprocal of a highest of the target-dimension values, the reciprocal of an average of all of the target-dimension values, and/or the reciprocal of a sum of all of the target-dimension values.

In yet another aspect of the present invention, the target-dimension values may be scaled by a growth factor to provide more current target-dimension values in cases where the target-dimension values are based on historical data.

DETAILED DESCRIPTION OF THE INVENTION

Figure 1:
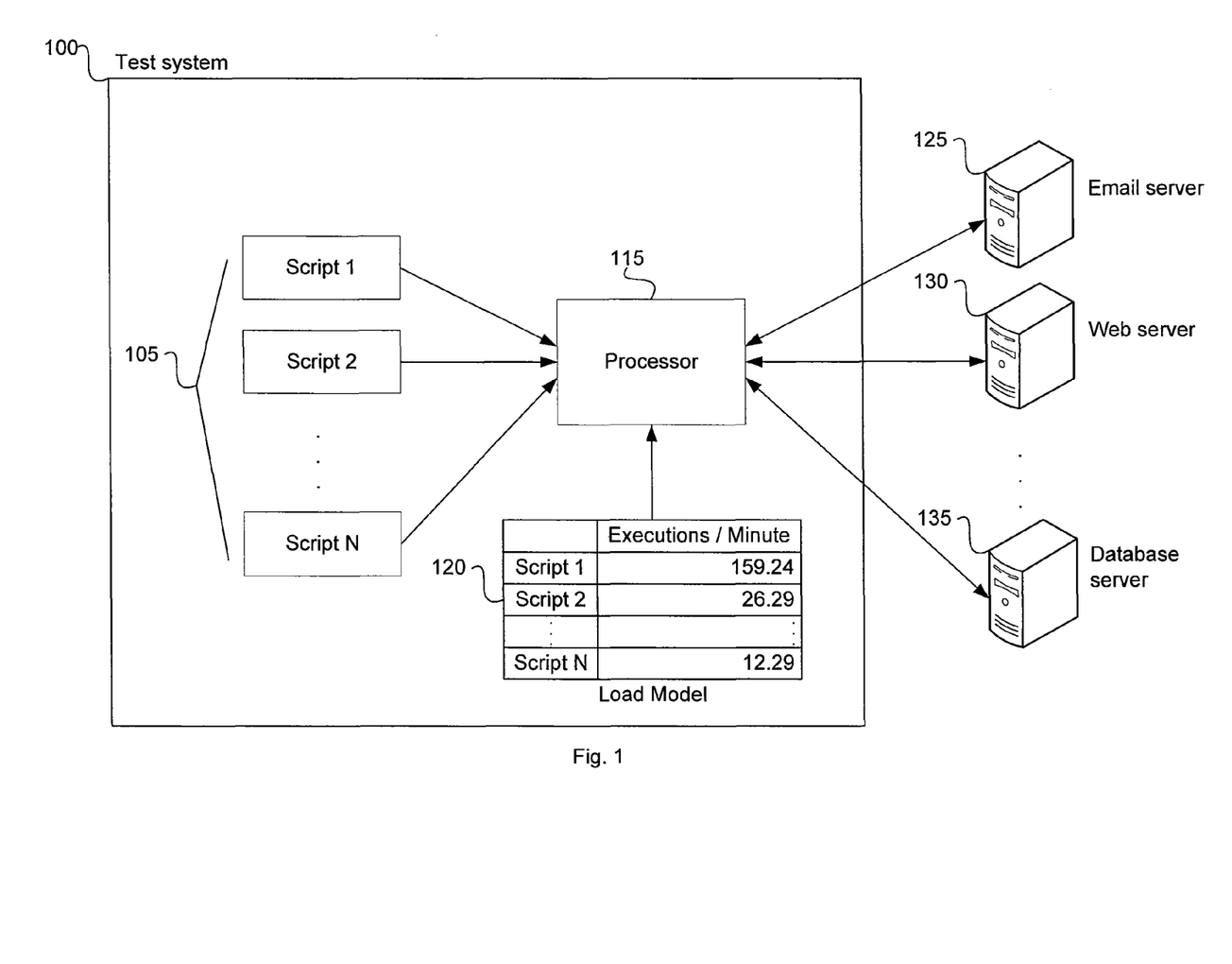
FIG. 1 is an embodiment of a test system for testing the robustness of computer systems in accordance with the present invention.

FIG. 1 is a test system 100 for testing the robustness of computer systems. The test system 100 includes a processor 115, test scripts 105, and a load model 120.

The processor 115 may correspond to any conventional computer or other data processing device capable of executing applications for verifying the functionality of computer systems. For example, the processor 115 may correspond to an Intel®, AMD®, or PowerPC® based processor operating, for example, a Microsoft Windows®, Linux, or other Unix® based operating system. The processor 115 may be adapted to execute applications such as a load model application and/or a load testing application, such as HP Load Runner®. The load testing application executes test scripts for testing the computer systems according to the load model. The processor 115 may also be adapted to communicate with the computer systems via an interface, such as a network interface.

The test scripts 105 correspond to code listings, executed by the processor 115, that enable testing functionality associated with the various computer systems. The code listings may correspond to a scripting language, such as Java® and/or Microsoft Visual Basic®. The code listings may also correspond to programming languages, such a C or C++. The test scripts 105 may include code listings designed to simulate human interactions associated with the various computer systems to be tested by test system 100. For example, a first test script may include code that enables simulating human interactions associated with reading and writing e-mail messages. In this case, the test script may include code that generates an e-mail message, selects a recipient for the e-mail message, and communicates the e-mail message to an e-mail server 125. A second test script may include code that enables simulating human interactions associated with browsing web pages. For example, the script may include code that requests a web page from a web server 130, specifies fields on the web page, and communicates the fields back to the web server 130. A third test script may include code that enables simulating human interactions associated with database interactions. For example, the script may include code that retrieves and stores data to and from a database server 135. Other systems and scripts for testing the systems may exist as well.

In operation, the processor 115 executes the test scripts 105 according to a load model 120. The load model 120 is generated by a load model application and specifies how many times per time period each of the test scripts 105 is executed. For example, a first script may be executed 159.24 times per minute and a second script may be executed 26.29 times per minute. How often to execute a given script is determined by the load model application. The load model application determines the execution rates of the scripts based on a variety of factors including various metrics that include dimensions. A metric corresponds to a collection of dimensions associated with a particular aspect of a system under test. A dimension corresponds to an operation performed within that particular metric or aspect of the system. For example, authentication metrics may be associated with an authentication server that performs operations, such as identity authentication, alternate identity authentication, password updating, group authentication, and/or operations for setting privileges with the system.

Figure 2:
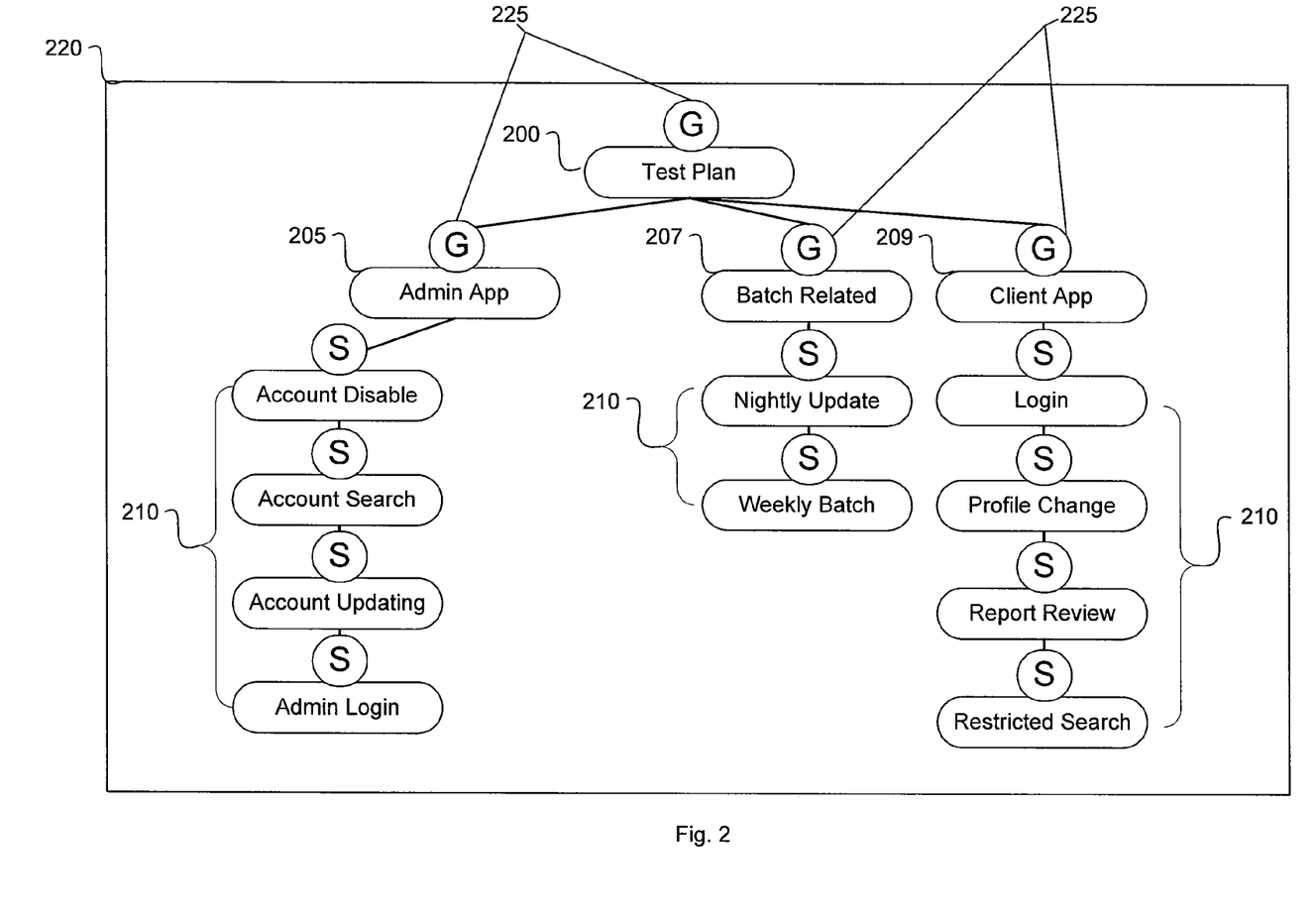
FIG. 2 is an embodiment of a tree structure of a test plan for testing a computer system in accordance with the present invention.
Figure 3:
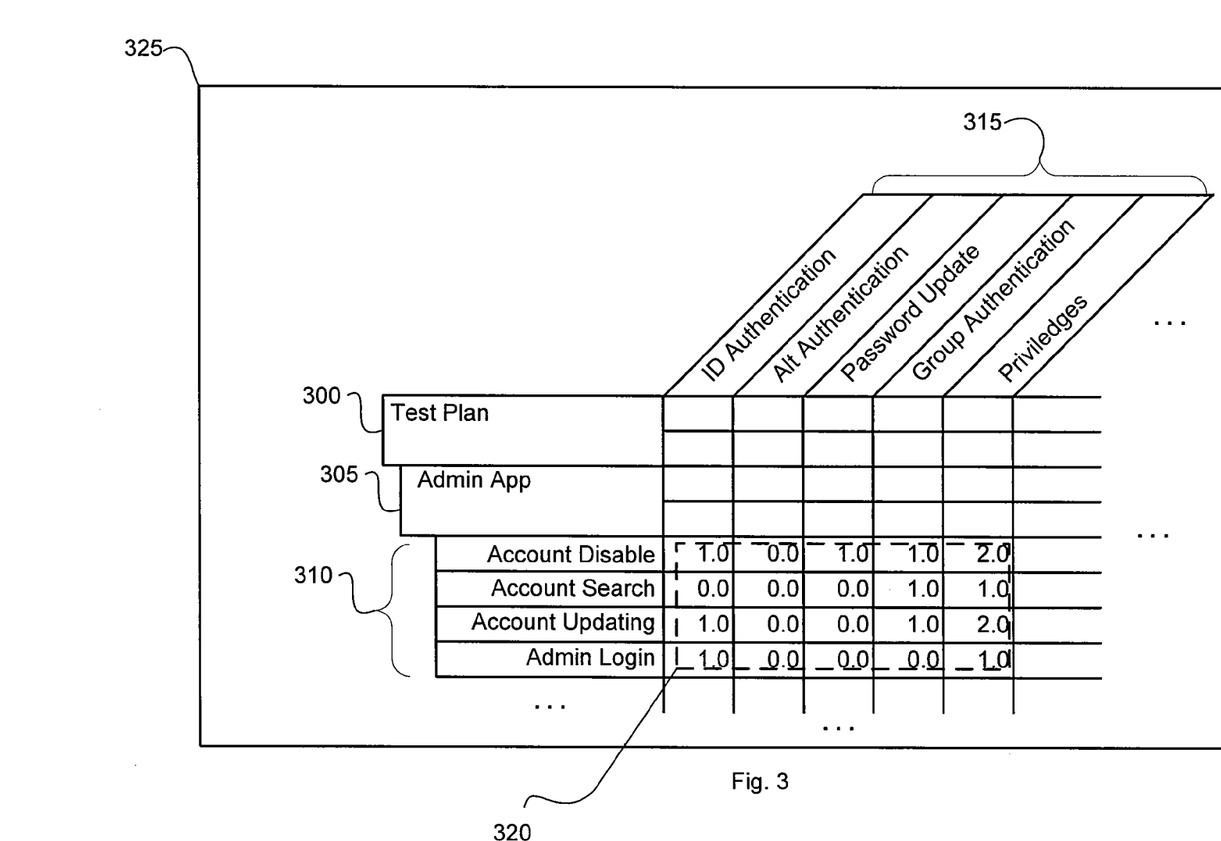
FIG. 3 is a portion of an exemplary table generated by an embodiment of a load model application that enables characterizing various test scripts utilized to test a computer system in accordance with the present invention.
Figure 4:
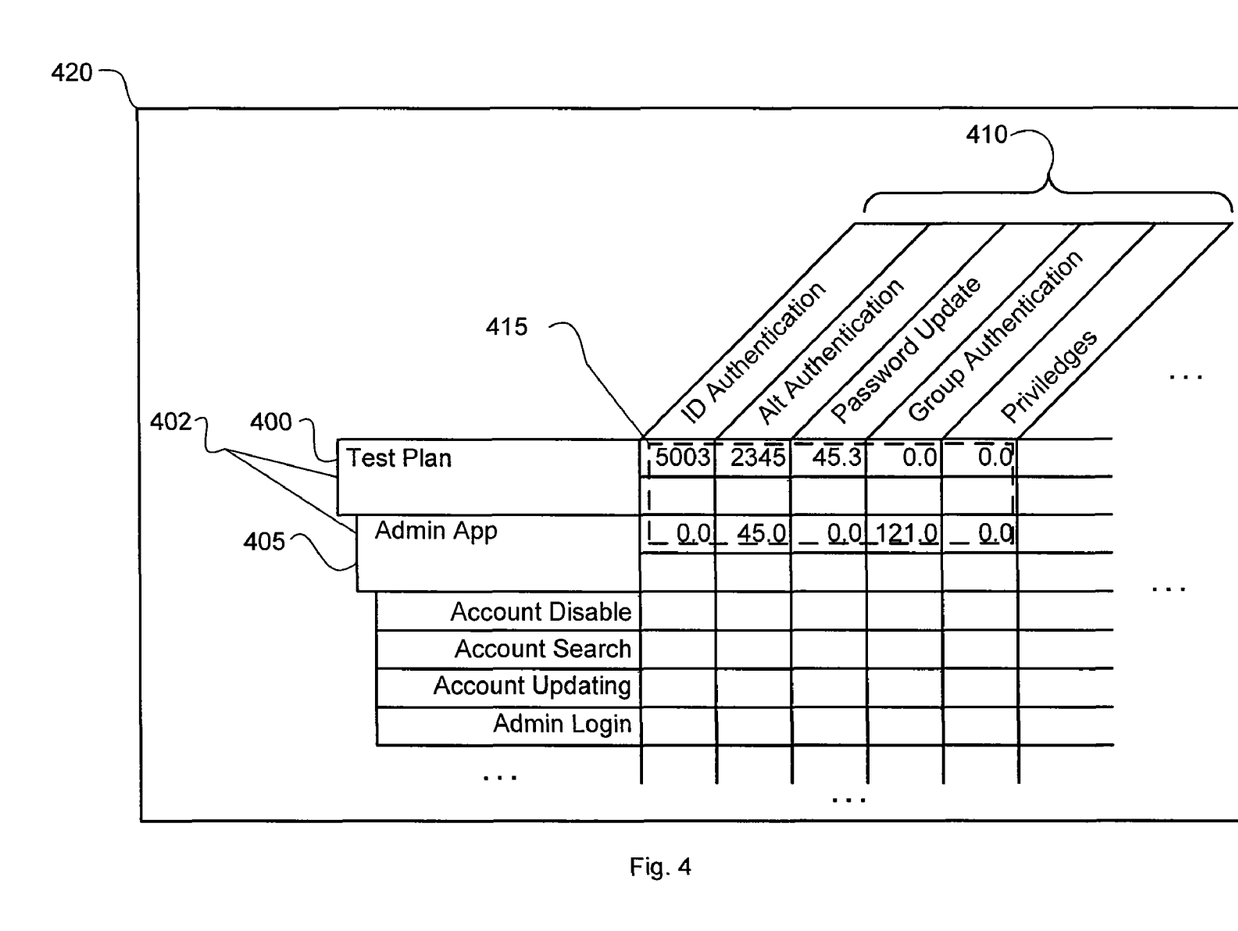
FIG. 4 is a portion of an exemplary table generated by the load model application used in FIG. 3 that enables specifying target information for groups in accordance with the present invention.

FIGS. 2-4 describe various user interfaces and operations associated with the load model application.

FIG. 2 is a tree structure 220 of a test plan for testing a computer system by the test system 100. The test plan may be created via the load model application described above. The tree structure 220 includes various group nodes 225 and several script nodes 210. The tree structure 220 may be utilized to define the relationships between various scripts utilized to test the computer system. The internal functionality of the load model application is guided by the grouping of the scripts. Often times there are important relationships between the scripts that may need to be taken into consideration. These relationships may be inherent to the way the software or computer systems operate. For example, in many web applications, after a user successfully logs in, the user is presented with a welcome screen. If there are two scripts, one for logging in and one for navigating the welcome screen, it may make sense to run them one after another. However, an unconstrained load model may attempt to break this relationship between the scripts because it was not aware of it. The tree structure 220 enables constraining the load model, so as to maintain these relationships.

Group nodes 225 are utilized to group related scripts and/or other groups, and to specify targeting information utilized to constrain the execution rates of scripts associated with the group. For example, a "Test Plan" group node 200 may be utilized to specify targeting information for all the scripts below the "Test Plan" group node 200 in the tree structure 220, which in this example includes those scripts below the "Admin App group" group node 205, "Batch Related" group node 207, and "Client App" group node 209. Each of these group nodes in turn may be utilized to specify targeting information for scripts below the respective group. For example, the "Admin App" group node 205 may be utilized to specify targeting information for all the scripts below the "Admin App" group node 205, which includes script nodes 210 for disabling an account, searching an account, updating an account, and logging into an account, by an administrator.

The previously mentioned target information includes a list of metrics, weights for each metric, values for dimensions associated with each metric, and growth factors for each metric. Weights are utilized to define the relative importance of the metrics. The target dimension values may be based on historic or expected values. Each metric in the profile may be multiplied by a growth factor to predict some future state or weighted to guide the model when making compromises. The growth factors are expressed as a multiple of historic values.

Script nodes 210 are utilized to specify a script footprint. A script corresponds to a code listing, executed by a processor that enables testing functionality associated with a computer system that is under test. A script footprint is a measure of the way in which a script affects the computer system as represented by the number of times per time period the script exercises operations of the computer system. A script footprint includes a list of dimensions that may be affected by the script, numeric values for each dimension that measures the effect of an individual execution of that script, and the minimum duration expected when running the script alone, without any other scripts running.

The footprint of a script may be determined by a combination of application knowledge and experimentation. It may be important to determine which metrics apply to a script. Often it takes access to an analyst with specific knowledge of the application to determine which web servers, databases and backend systems are touched when running a script. If that is not available, it may be possible to determine this information by running the script alone, without any other scripts running, and logging and/or monitoring the behavior of the script.

After determining the list of metrics that apply to a script, it may be best to measure the effects of the script in a clean environment with logging/monitoring enabled for those system metrics that have been targeted. Running a script multiple times may help identify and eliminate errors or unintended traffic. For example, if a script is run twenty times in succession, then the resulting traffic may occur in multiples of twenty. Metrics that are not in even multiples either show interfering background traffic (which can often be ignored and subtracted) or a variable (non-deterministic) behavior. This type of traffic may be accounted for with fractional values.

FIG. 3 is a portion of an exemplary table 325 generated by the load model application that enables specifying the footprint of various scripts utilized to test computer systems, as described above. The table 325 includes scripts 310, dimensions 315 that may be affected by a script, and dimension-effect-fields 320. Each dimension 315 corresponds to an operation performed by the system under test. For example, an authentication server of the system under test may perform operations such as identity authentication, alternate identity authentication, password updating, group authentication, and/or operations for setting privileges with the system. These operations are represented by the dimensions 315 at the top of the table 325.

The dimension-effect-fields 320 are input fields of the exemplary table that are utilized to specify a value associated with the effect of an individual execution of a script on a given dimension 315. For example, referring to FIG. 3, the "Account Disable" script may affect the "ID Authentication," "Password Update," and "Group Authentication" dimensions 315 one time per execution, and the "Privileges" dimension two times per execution, as illustrated by the dimension-effect values 1.0 and 2.0 in the exemplary table 325. The "Admin Login" script may affect the "ID Authentication" dimension and "Group Authentication" dimension one time per execution.

The scripts 310 in the exemplary table 325 are grouped together according to the tree structure 220 of FIG. 2. For example, in the exemplary table 325, the scripts 310 "Account disable," "Account Search," "Account Updating," and "Admin Login" are grouped below the "Admin App" group 305, which in turn is below the "Test Plan" group 300.

FIG. 4 is a portion of an exemplary table 420 generated by the load model application that enables specifying target information for groups as described above. The table 420 includes group rows 402, dimensions 410, and target-dimension fields 415. The group rows 402 shown in the exemplary table 420 may correspond to groups shown in the exemplary tree structure 220 of FIG. 2. For example, the table 420 includes a "Test Plan" group row 400 row and an "Admin App" group row 405.

The dimensions 410 may correspond to dimensions that are effected by the various scripts, such as the dimensions "ID Authentication," "Alt Authentication," "Password Update," "Group Authentication," and "Privileges" as described above with reference to FIG. 3.

The target-dimension fields 415 are utilized to specifying target-dimension values for each dimension. In the exemplary table 420, the target dimensions 415 specified in the "Test Plan" group row 400 and "Admin App" group row 405 are utilized to constrain the number of times per time period the dimensions 410 are affected by scripts associated with those groups. For example, referring to the table 420, the number of times per minute the dimensions "ID Authentication," "Alt Authentication," and "Password Update" may be affected by scripts that are part of the "Test Plan" group 400 may be constrained to 5003, 2345, and 45.3 times per minute respectively. Similarly, within the "Admin App" group 405 the number of times per minute the dimensions "Alt Authentication" and "Group Authentication" may be affected by scripts that are part of the "Admin App" group 405 may be constrained to 45.0 and 121 times per minute, respectively.

Tables 1-10 below describe how the load model application determines the optimal execution rate, of the individual scripts, necessary to meet the defined targets. Table 1 shows exemplary script footprints or script profiles associated with various scripts. In this case, the Table defines the footprints of scripts named "Script 1" and "Script 2". The dimensions of a system under test that may or may not be affected by the scripts are listed across the top of the table and include, "Query 1," "Query 2," "URL 1," "URL 2," and "URL 3." The query dimensions may correspond to operations performed by a database and are therefore included under the heading of "Database metric". Similarly, the URL dimensions may correspond to operations performed by a web server and are therefore included under the heading of "Web metric."

The script footprint is defined by the script-dimension values in the table. The script-dimension values correspond to the number of times the various dimensions are affected by the script each time the script executes. For example, as shown in Table 1, "Script 1" affects dimension "Query 2" one time per execution, "URL 1" two times per execution, and "URL 3" one time per execution. "Script 2" affects dimension "Query 1" one time per execution, "URL 2" one time per execution, and "URL 3" one time per execution.

TABLE 1

Exemplary script profiles

|  | Database metric | | Web metric | | |
|---|---|---|---|---|---|
|  | Query 1 | Query 2 | URL 1 | URL 2 | URL 3 |
| Script 1 | 0 | 1 | 2 | 0 | 1 |
| Script 2 | 1 | 0 | 0 | 1 | 1 |

Table 2 below is a table showing target-dimension values corresponding to the number of times per minute that the dimensions in Table 1 ideally be affected.

TABLE 2

Exemplary target function execution counts

|  | Database metric | | Web metric | | |
|---|---|---|---|---|---|
|  | Query 1 | Query 2 | URL 1 | URL 2 | URL 3 |
| Target | 10 | 8 | 16 | 10 | 18 |

In this case, the table specifies that the dimensions "Query 1," "Query 2," "URL 1," "URL 2," and "URL 3" should be affected 10, 8, 16, 10, and 18 times per minute, respectively. That is, when executing "Script 1" and "Script 2" simultaneously, the number of times that a given dimension is affected should be constrained to the target-dimension values in the Table 2.

The question becomes: What is the optimal number of times to execute "Script 1" and "Script 2" in Table 1, so as to best match the target-dimensions values of Table 2? Table 3 represents a solution to this problem.

TABLE 3

Exemplary perfect fit solution

|  | Database | | Web metric | | | | Database | | Web metric | | |
|---|---|---|---|---|---|---|---|---|---|---|---|
|  | Q1 | Q2 | URL 1 | URL 2 | URL 3 | | Q1 | Q2 | URL 1 | URL 2 | URL 3 |
| Target | 10 | 8 | 16 | 10 | 18 | | 10 | 8 | 16 | 10 | 18 |
| Script 1 | 0 | 1 | 2 | 0 | 1 | ×8 | 0 | 8 | 16 | 0 | 8 |
| Script 2 | 1 | 0 | 0 | 1 | 1 | ×10 | 10 | 0 | 0 | 10 | 10 |

The target-dimension values of Table 1 and script-dimension values of Table 2 are represented on the left side of Table 3. The middle portion of Table 3 represents the number of times per minute that each script is executed. For example, "×8" indicates that "Script 1" is executed 8 times per minute, and "×10" indicates the "Script 2" is executed 10 times per minute.

The right side of Table 3 shows the actual number of times per minute that the dimensions are affected by the scripts. For example, when "Script 1" is executed 8 times in one minute, the dimensions "Q2," "URL 1," and "URL 3" are affected 8, 16, and 8 times per minute respectively. When "Script 2" is executed 10 times in one minute, the dimensions "Q1," "URL 2," and "URL 3" are each affected 10 times per minute.

In this case, executing "Script 1" eight times per minute and "Script 2" ten times per minute provides a perfect solution to the problem because the actual number of times the dimensions are affected on the right side of the table equals the target-dimension values on the left side of the table. For example, the actual number of times the dimension "Q1" is affected equals 10 times per minute, which is equal to the target-dimension value for "Q1." Likewise, the actual numbers of times the other dimensions are affected correspond to the respective target-dimension values. This means that executing "Script 1" 8 times per minute and "Script 2" 10 times per minute is the best combination of execution rates.

Often times, the target-dimension values are based on historic values. In this case a growth factor may be applied to the target-dimension values to provide more current target-dimension values. For example, all the target-dimension values may be doubled to bring historic target-dimension values to more current values.

The previous example was a perfect solution because all the target-dimension values were met. This may happen under real-world conditions where the scripts are faithful to user behaviors. However, oftentimes, user behaviors are too complex, or the target-dimension values are estimated making it difficult, if not impossible, to find a perfect fit. This may result in an error between the actual and target-dimension values. The goal in these situations is to find a combination of script execution rates that minimizes this error. The following paragraphs explain how this is accomplished.

TABLE 4

Best fit solution

|  | A | B | C |  |  | A | B | C |
|---|---|---|---|---|---|---|---|---|
| Target | 10 | 10 | 10 | × | Target | 10 | 10 | 10 |
| Script 1 | 1 | 1 | 0 | 6 | Script 1 | 6 | 6 | 0 |
| Script 2 | 0 | 1 | 1 | 6 | Script 2 | 0 | 6 | 6 |
|  |  |  |  |  | Totals | 6 | 12 | 6 |
|  |  |  |  |  | Errors | 4 | −2 | 4 |

Table 4 represents a case where a perfect fit cannot be found. In this case, both scripts are executed six times per minute, but this results in an error as shown on the right side. Here, the actual values for dimensions A, B, and C is off by 4, −2, and 4 respectively. In other words, functions A and C are affected four times per minute too few times, and dimension B is affected two times per minute too many times.

Since each error, negative or positive, represents some level of failure to meet the target, all the error values should be counted. Directly adding these numbers together is not possible since the negative and positive errors will cancel out. Instead, the total error is computed according to the following equation:

$$\text{Total Error} = 4^2 + (-2)^2 + 4^2$$

The advantage of representing the error this way is that it lends itself to the application of the mathematical approach known as Linear Least Square (LLS). This approach enables finding combinations of script execution rates that minimize the total error.

Generally, application of the LLS approach begins by considering an over determined system in the form $$\sum_{j=1}^{n} X_{ij}\beta = y_i, (i = 1, 2, \ldots, m),$$

of m linear equations in n unknowns, $\beta_1, \beta_2, \ldots, \beta_n$, with m>n, written in matrix form as $X\beta=y$. The Linear Least Square approach has a unique solution, provided that the n columns of the matrix X are linearly independent. The solution may be obtained by solving the normal equations $(X^T X)\hat{\beta} = X^T y$.

When finding a best combination, the model may have different metrics that are used simultaneously to define a load. Often times, those metrics have completely different units and scale. For example, database calls may occur at a rate of 5000 times per minute, while a web server may be providing a page at a rate of 30 times per minute. When these two metrics are processed by the LLS algorithm, a 10% error on the database end is 500 and is squared to 250,000; where a 10% error or the web server end is 3 squared to 9. Since the error value for the database is much larger, the model will make extreme sacrifices at the cost of web server traffic to meet database targets. An example where the units and scale are completely different is shown in Table 5 below.

TABLE 5

Unweighted best fit solution

|  | Web metric | | | Database metric | | | | Web metric | | | Database metric | | |
|---|---|---|---|---|---|---|---|---|---|---|---|---|---|
|  | A | B | C | D | E | F |  | A | B | C | D | E | F |
| Target | 10 | 10 | 10 | 100 | 100 | 100 | × | 10 | 10 | 10 | 100 | 100 | 100 |
| Script 1 | 1 | 0 | 0 | 10 | 0 | 0 | 10 | 10 | 0 | 0 | 100 | 0 | 0 |
| Script 2 | 0 | 1 | 0 | 0 | 5 | 0 | 19.62 | 0 | 19.62 | 0 | 0 | 98.1 | 0 |
| Script 3 | 0 | 0 | 2 | 0 | 0 | 10 | 9.81 | 0 | 0 | 19.62 | 0 | 0 | 98.1 |
|  |  |  |  |  |  |  | Errors | 0 | −9.62 | −9.62 | 0 | 1.92 | 1.92 |
|  |  |  |  |  |  |  | % | 0.0% | 96.2% | 96.2% | 0.0% | 1.9% | 1.9% |

In this example, the combination of execution rates that minimizes the total error may correspond to executing "Script 1" 10 times per minute, "Script 2" 19.62 times per minute, and "Script 3" 9.81 times per minute. However, executing the scripts according to these rates, while minimizing the overall error, results in an error of 96.2% in the actual dimension values associated with dimensions B and C as opposed to an error of 1.9% for the actual dimension values associated with dimensions E and F. In other words, the error is not balanced across the dimensions. This occurs because the target-dimension values for the "Web metric" is an order of magnitude below those of the "Database metric."

As this may not be the intended result, weightings may be provided. There are several ways to define weights between metrics: manual weights and automatic normalization. Manual weights are values that may be assigned to each metric dimension value in a group. The target-dimension values and script-dimension values may be multiplied by this weight, and this may result in a different best fit solution.

Table 6 below illustrates the results when weighting values are applied. In this case, the dimension values A, B, and C are multiplied times the weighting value 10 and the dimension values for D, E, and F are multiplied by the weighting value 1. With these weightings applied, the combination of execution rates that minimizes the total error now corresponds to executing "Script 1" 10 times per minute, "Script 2" 12 times per minute, and "Script 3" 6 times per minute. When executing the scripts according to these rates, the error associated with dimension values B and C decreases from 96.2% to 20% and the error associated with dimension values E and F increases from 1.9% to 40%. The error between dimensions is now more balanced.

Target-dimension values in the second group are divided by 100, which is the maximum target-dimension value in that group. This effectively changes the target-dimensions in the second group from 100, 24, and 4 to 1, 0.24, and 0.04 respectively.

TABLE 8

Peak value weighting

| Target  | 10 | 1    | 1 | 100 | 24    | 4 |
|---------|----|------|---|-----|-------|---|
| Weights |    | 1/10 |   |     | 1/100 |   |

Table 9 below illustrates weighting based on the average of the target-dimension values within a group. In this case, the first group of target-dimension values is divided by 4.6, which corresponds to the average of the target-dimension values 10, 3, and 1, and the second group of target-dimension values is divided by 42.6, which is the average of the target-dimension values 100, 24, and 4. This effectively changes the target-dimension values of the first group to 2.2, 0.65, and 0.22, and the target-dimension values of the second group to 2.35, 0.56, and 0.09 respectively.

TABLE 6

Manually weighted best fit solution

|          | Web metric |    |    | Database metric |     |     |        | Web metric |       |       | Database metric |       |       |
|----------|------------|----|----|-----------------|-----|-----|--------|------------|-------|-------|-----------------|-------|-------|
|          | A          | B  | C  | D               | E   | F   |        | A          | B     | C     | D               | E     | F     |
| Target   | 10         | 10 | 10 | 100             | 100 | 100 | ×      | 10         | 10    | 10    | 100             | 100   | 100   |
| Script 1 | 1          | 0  | 0  | 10              | 0   | 0   | 10     | 10         | 0     | 0     | 100             | 0     | 0     |
| Script 2 | 0          | 1  | 0  | 0               | 5   | 0   | 12     | 0          | 12    | 0     | 0               | 60    | 0     |
| Script 3 | 0          | 0  | 2  | 0               | 0   | 10  | 6      | 0          | 0     | 12    | 0               | 0     | 60    |
| Weights  |            | 10 |    |                 | 1   |     | Errors | 0          | −2    | −2    | 0               | 40    | 40    |
|          |            |    |    |                 |     |     | %      | 0.0%       | 20.0% | 20.0% | 0.0%            | 40.0% | 40.0% |

While weightings may be used to even out the effects of different scaled metrics, they may also be used to introduce an intended preferential treatment of metrics. For example, in Table 7 below, preference is given to the "Web metric" dimensions rather than the "Database metric" dimensions by weighting the "Web metric" dimensions by a factor of 15 and weighting the "Database metric" dimensions by a factor of 1.

TABLE 9

Average value weighting

| Target  | 10 | 3     | 1 | 100 | 24     | 4 |
|---------|----|-------|---|-----|--------|---|
| Weights |    | 1/4.6 |   |     | 1/42.6 |   |

TABLE 7

Manually weighted to provide preferential results

|          | Web metric |    |    | Database metric |     |     |        | Web metric |       |       | Database metric |       |       |
|----------|------------|----|----|-----------------|-----|-----|--------|------------|-------|-------|-----------------|-------|-------|
|          | A          | B  | C  | D               | E   | F   |        | A          | B     | C     | D               | E     | F     |
| Target   | 10         | 10 | 10 | 100             | 100 | 100 | ×      | 10         | 10    | 10    | 100             | 100   | 100   |
| Script 1 | 1          | 0  | 0  | 10              | 0   | 0   | 10     | 10         | 0     | 0     | 100             | 0     | 0     |
| Script 2 | 0          | 1  | 0  | 0               | 5   | 0   | 12     | 0          | 12    | 0     | 0               | 60    | 0     |
| Script 3 | 0          | 0  | 2  | 0               | 0   | 10  | 6      | 0          | 0     | 12    | 0               | 0     | 60    |
| Weights  |            | 15 |    |                 | 1   |     | Errors | 0          | −1    | −1    | 0               | 45    | 45    |
|          |            |    |    |                 |     |     | %      | 0.0%       | 10.0% | 10.0% | 0.0%            | 45.0% | 45.0% |

Normalized weighting values may also be applied. Normalized weights attempt to find a fit that considers all metrics equally. Tables 8-10 illustrate various ways in which the weights may be normalized.

Table 8 illustrates weighting based on the peak metric value within a group. In this case, target-dimension values in the first group are divided by the maximum target-dimension value of 10. This effectively changes the target-dimensions in the first group from 10, 1, and 1 to 1, 0.1, and 0.1 respectively.

Table 10 below illustrates weighting based on the sum of the target-dimension values within a group. In this case, the first group of target-dimension values is divided by 45, which corresponds to the sum of the target-dimension values 12, 10, 8, 7, and 4, and the second group of target-dimension values is divided by 25, which is the sum of the target-dimension values 2, 2, 12, 9, and 4. This effectively changes the target-dimension values of the first group to 0.27, 0.22, 0.18, 0.16, and 0.09, respectively, and the target-dimension values of the second group to 0.08, 0.08, 0.48, 0.36, and 0.16, respectively.

TABLE 10

Total value weighting

| Target Weights | 12 | 10 | 8 | 7 | 4 | 2 | 2 | 12 | 9 | 4 |
|---|---|---|---|---|---|---|---|---|---|---|
| | | 1/45 | | | | | | 1/25 | | |

Figure 5:
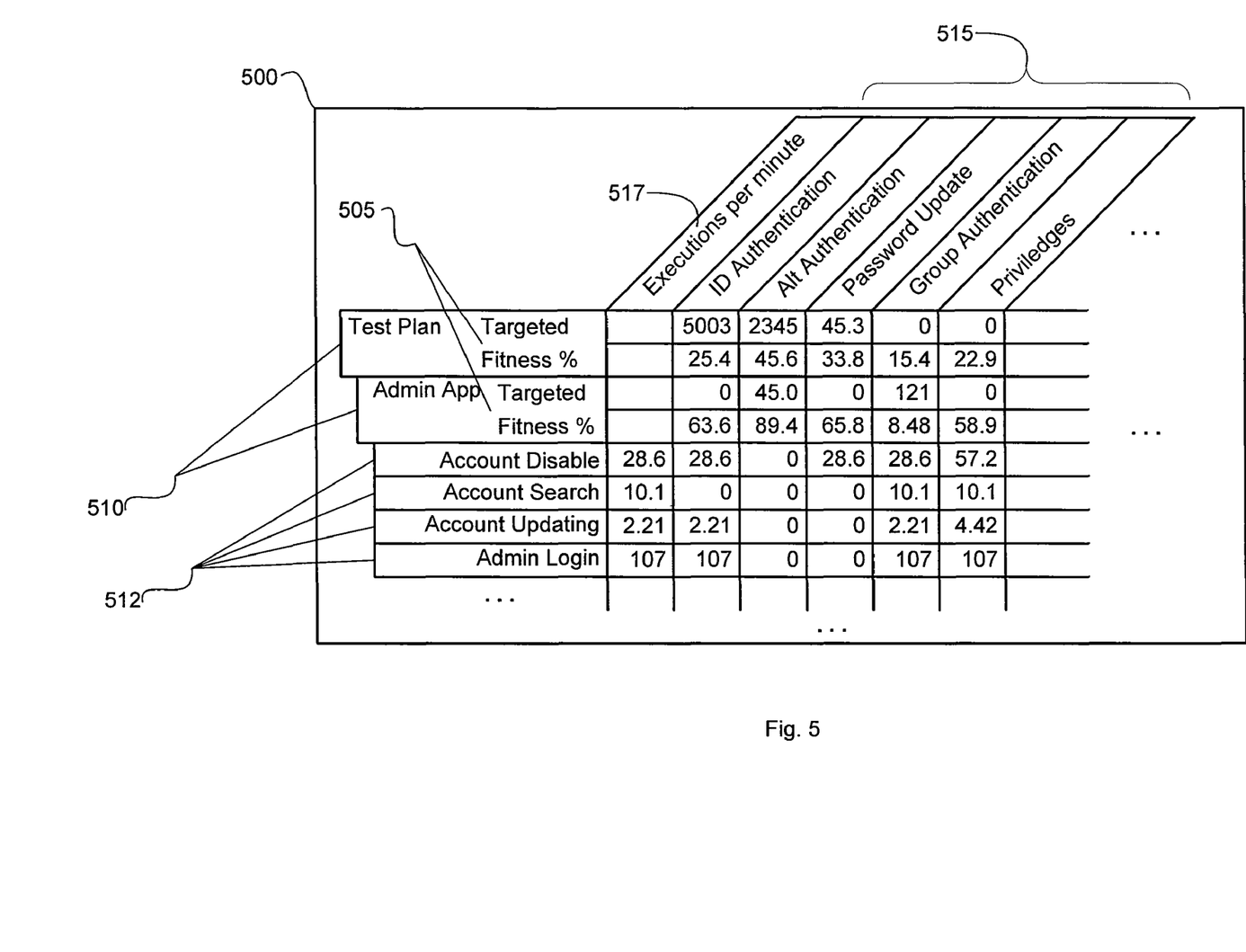
FIG. 5 is a portion of an exemplary result table generated by the load model application of FIG. 3 in accordance with the present invention.

FIG. 5 is a portion of an exemplary result table 500 that is generated by the load model after completing the steps of defining metrics, building the component tree, and inputting target and script profiles. The portion of the exemplary result table 500 may be communicated to a display, so that an operator may assess the effectiveness of the load model in testing a system under test. The left side of the result table 500 includes groups 510 and scripts 512. The top of the result table 500 includes an execution rate column 517 and dimensions 515. Each group 510 includes a row for the targeted-dimension value. For example, as shown in the table, the targeted-dimension values for the "ID Authentication," "Alt Authentication," "Password Update," "Group Authentication," and "Privileges" dimensions as related to the "Test Plan" group correspond to 5003, 2345, 45.3, 0, and 0, respectively. The targeted-dimension values for the "ID Authentication," "Alt Authentication," "Password Update," "Group Authentication," and "Privileges" dimensions as related to the "Admin App" group correspond to 0, 45.0, 0, 121, and 0, respectively.

Each script 512 row includes values corresponding to the actual dimension-effect values of a script. The actual dimension-effect value of a script corresponds to the dimension-effect values of a script multiplied by the execution rate value in the corresponding execution rate column 517. The values in the execution rate column 517 correspond to the combination of execution rates that minimizes the total error, as described above. In this case, executing the scripts "Account Disable," "Account Search," "Account Updating," and "Admin Login" 28.6, 10.1, 2.21, and 107 times per minutes, respectively, minimizes the total error. When executed according to these rates, the "Account Disable" script affects the dimensions "ID Authentication," "Password Update," and "Group Authentication" 28.6 times per minute, and the "Privileges" dimension 57.2 times per minute. The "Account Search" script affects the dimensions "Group Authentication" and "Privileges" 10.1 times per minute. The "Account Updating" script affects the dimensions "ID Authentication" and "Group Authentication" 2.21 times per minute and "Privileges" dimension 4.42 times per minute. Finally, the "Admin Login" script affects the dimensions "ID Authentication," "Group Authentication," and "Privileges" 107 times per minute.

Each group 510 also includes a fitness row 505. The fitness row 505 includes values that describe how close the traffic generated by the model may be to the target traffic. A score of 0% means that the target was completely missed, and a value of 100% is a perfect match. There are a number of ways to interpret the data in the result table 500. Instances where the fitness score is 0% may indicate that no script touches on a metric dimension. When this is the case, the load model application will be unable to generate a solution that generates traffic for that dimension. This problem may be corrected by introducing new scripts or expanding existing scripts.

Instances where the fitness score is low for a number of metric dimensions shared by a script may indicate that real-world users, from where the target information comes from, are utilizing a particular application in an unexpected way. For example, if a script goes from page A to page B, then to page C every time, but real-world users skip page B 90% of the time, there may not be a good solution.

If there are very few metrics, and these metrics are affected equally by a number of scripts, then there may be many possible solutions. While any of these solutions may meet the target load, only one is correct. Providing additional target data or estimates may fix the situation. Unfortunately, it may not be obvious when this problem occurs, as the fit % may be very good. It may need to be proactively identified. One clue may be a repeating pattern in the load generated, as the model tries to distribute the values equally, but this does not always occur.

When there is limited data shared by a number of scripts AND they have invalid proportions, the model may come up with a bizarre solution that involves a negative number of executions per minute. This occurs when the model attempts to solve an invalid proportion, but there is not enough data to limit it to a realistic compromise. Normally, the model would not consider a negative solution because it would create a large amount of error as it will never approach the positive target values. However, if the target metrics are shared by other scripts, and are already too high due to invalid proportions, then running a script a negative number of times may seem like a good idea (mathematically). However, this is not possible in the real-world, so this problem should be addressed with new scripts and additional data.

Figure 6:
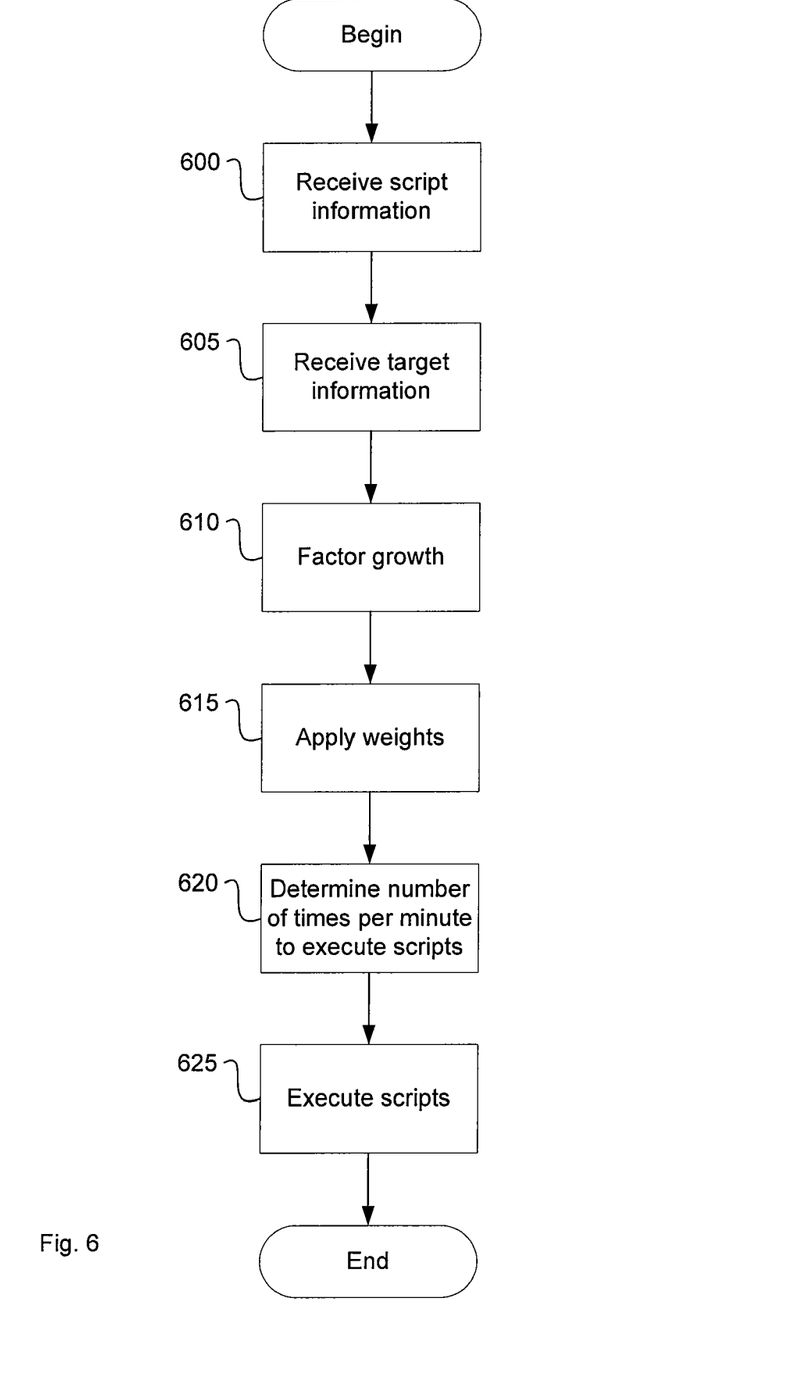
FIG. 6 is a flow diagram that describes the operations of the load model application of FIG. 3.

FIG. 6 is a flow diagram that describes the operations of the load model application described above. At block 600, the footprint information for various scripts utilized to test a computer system may be specified. As described above, a script footprint is a measure of the way in which a script affects the computer system as represented by the number of times per time period the script exercises operations of the computer system. Receiving the footprint information may involve specifying information such as a list of metric dimensions that may be affected by the script, numeric values for each metric dimension that measures the effect of an individual execution of that script, and the minimum duration expected when running the script in a clean environment. This information may be specified via the exemplary table 325 of FIG. 3 or a different user interface.

At block 605, target information may be specified. As described above, target information includes target dimension values corresponding to a desired number of times per time period each dimension above should be affected. The information may include a list of metrics, weights for each metric, values for dimensions associated with each metric, and growth factors for each metric. This information may be specified via the exemplary table 420 of FIG. 4 or a different user interface.

At block 610, a growth factor may be applied to all the target-dimension values, so as to predict some future state to guide the model when making compromises. The growth factor may be applied when the target-dimension values are based on historic values. The growth factor may enable converting the historic target-dimension values to target-dimension values that are more representative of the current state of the computer system. For example, all the target-dimension values may be doubled to bring historic target-dimension values to more current values At block 615, weights may be applied to all the target-dimension values for a given metric. The weights may be utilized to define the relative importance of the metrics. The weights may be manually specified or automatically normalized. Manual weights may be utilized to provide specialized treatment for a group of metrics. Normalized weights may be utilized to even out the effects of different scaled metrics. In this case the weightings may be based on the maximum target-dimension value, average target-dimension values, or sum of target-dimension values within a metric.

At block 620, the load model application may determine the optimal number of times to execute scripts, so as to minimize the differences between the number of times the dimensions are affected and the target-dimension values. The load model application may utilize an LLS algorithm or other suitable algorithm utilized to determine a set of coefficients that minimizes the error of a system of equations. For example, the LLS algorithm may determine the optimal number of times to execute the various scripts, so as to minimize the overall difference between the target-dimension values and the actual-dimension values. After determining the information, the load model application may generate a result table, such as the exemplary result table 500 of FIG. 5. The result table may be communicated to a display, so that an operator may interpret the results.

At block 625, the scripts may be executed according to the execution rates determined at block 620. For example, referring to FIG. 1, the processor 115 may execute test scripts 105 according to a load model 120, so as to test the functionality of various computer systems, such as an e-mail server 125, web server 130, and database server 135. Alternatively, the load model may be communicated to another system that is operative to test the system under test.

Figure 7:
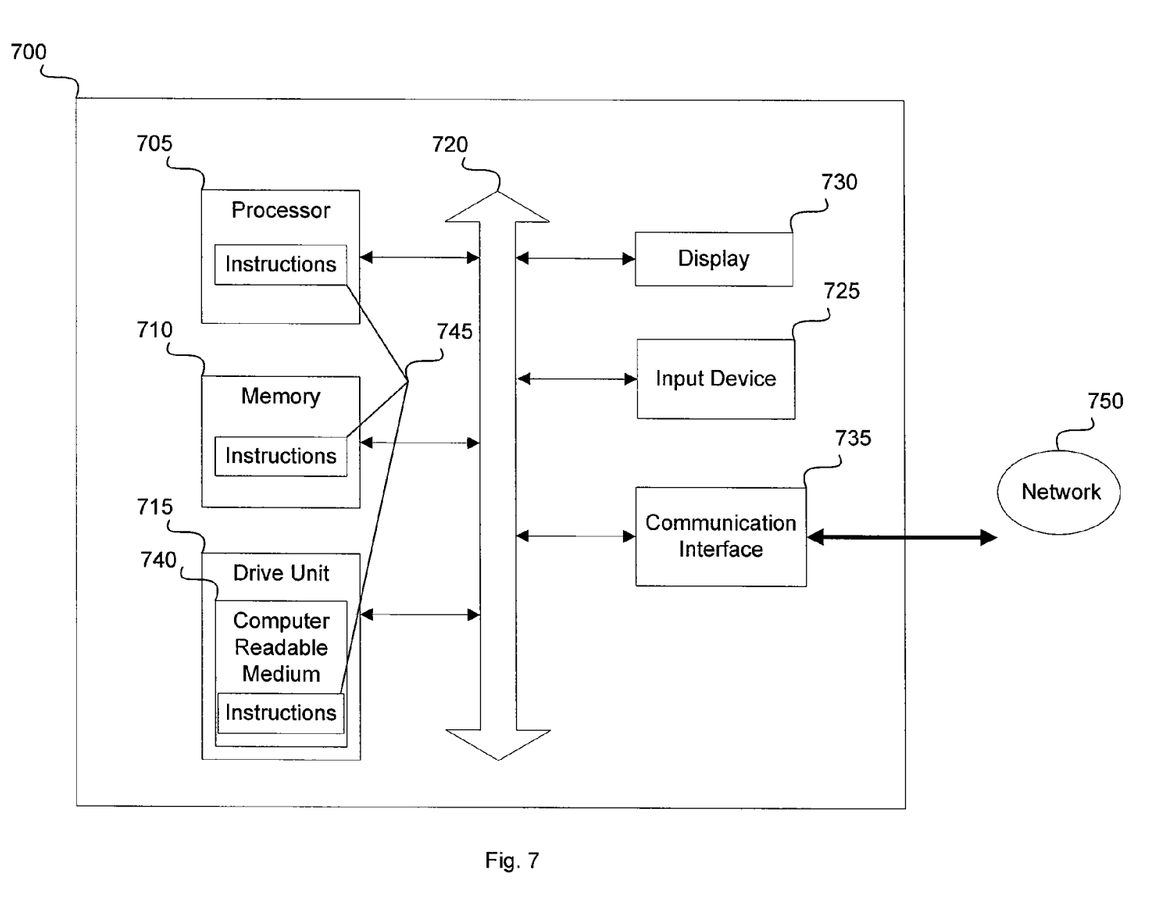
FIG. 7 schematically illustrates an embodiment of a computer system using the load model application of FIG. 3 in accordance with the present invention.

FIG. 7 illustrates a general computer system 700, which may represent the processor 115 of the test system 100 shown in FIG. 1; or the e-mail server 125, web server 130, database server 135 shown in FIG. 1; or any of the other computing devices referenced herein. The computer system 700 may include a set of instructions 745 that may be executed to cause the computer system 700 to perform any one or more of the methods or computer-based functions disclosed herein. The computer system 700 may operate as a stand-alone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 745 (sequential or otherwise) that specify actions to be taken by that machine. In one embodiment, the computer system 700 may be implemented using electronic devices that provide voice, video or data communication. Further, while a single computer system 700 may be illustrated, the term "system" shall also be taken to include any collection of systems or sub-systems that individually or jointly execute a set, or multiple sets, of instructions to perform one or more computer functions.

As illustrated in FIG. 7, the computer system 700, may include a processor 705, such as a central processing unit (CPU), a graphics processing unit (GPU), or both. The processor 705 may correspond to the processor 115 of the test system 100. The processor 705 may be a component in a variety of systems. For example, the processor 705 may be part of a standard personal computer or a workstation. The processor 705 may be one or more general processors, digital signal processors, application specific integrated circuits, field programmable gate arrays, servers, networks, digital circuits, analog circuits, combinations thereof, or other now-known or later-developed devices for analyzing and processing data. The processor 705 may implement a software program, such as code generated manually (i.e., programmed).

The computer system 700 may include a memory 710 that can communicate via a bus 720. The memory 710 may be a main memory, a static memory, or a dynamic memory. The memory 710 may include, but may not be limited to, computer-readable storage media such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one case, the memory 710 may include a cache or random access memory for the processor 705. Alternatively or in addition, the memory 710 may be separate from the processor 705, such as a cache memory of a processor, the system memory, or other memory. The memory 710 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 710 may be operable to store instructions 745 executable by the processor 705. The functions, acts or tasks illustrated in the figures or described herein may be performed by the programmed processor 705 executing the instructions 745 stored in the memory 710. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 730, such as a liquid crystal display (LCD), an organic light emitting diode (OLED), a flat panel display, a solid state display, a cathode ray tube (CRT), a projector, a printer or other now-known or later-developed display device for outputting determined information. The display 730 may act as an interface for the user to see the functioning of the processor 705, or specifically as an interface with the software stored in the memory 710 or in a drive unit 715.

Additionally, the computer system 700 may include an input device 725 configured to allow a user to interact with any of the components of system 700. The input device 725 may be a number pad, a keyboard, or a cursor control device, such as a mouse, or a joystick, touch screen display, remote control or any other device operative to interact with the system 700.

The computer system 700 may also include a disk or optical drive unit 715. The disk drive unit 715 may include a computer-readable medium 740 in which one or more sets of instructions 745, e.g., software, can be embedded. Further, the instructions 745 may perform one or more of the methods or logic as described herein. The instructions 745 may reside completely, or at least partially, within the memory 710 and/or within the processor 705 during execution by the computer system 700. The memory 710 and the processor 705 also may include computer-readable media as discussed above.

The present disclosure contemplates a computer-readable medium 740 that includes instructions 745 or receives and executes instructions 745 responsive to a propagated signal; so that a device connected to a network 750 may communicate voice, video, audio, images or any other data over the network 750. The instructions 745 may be implemented with hardware, software and/or firmware, or any combination thereof. Further, the instructions 745 may be transmitted or received over the network 750 via a communication interface 735. The communication interface 735 may be a part of the processor 705 or may be a separate component. The communication interface 735 may be created in software or may be a physical connection in hardware. The communication interface 735 may be configured to connect with a network 750, external media, the display 730, or any other components in system 700, or combinations thereof. The connection with the network 750 may be a physical connection, such as a wired Ethernet connection or may be established wirelessly as discussed below. Likewise, the additional connections with other components of the system 700 may be physical connections or may be established wirelessly.

The network 750 may include wired networks, wireless networks, or combinations thereof. The wireless network may be a cellular telephone network, an 802.11, 802.16, 802.20, or WiMax network. Further, the network 750 may be a public network, such as the Internet, a private network, such as an intranet, or combinations thereof, and may utilize a variety of networking protocols now available or later developed including, but not limited to, TCP/IP based networking protocols.

The computer-readable medium 740 may be a single medium, or the computer-readable medium 740 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 740 may include a solid-state memory such as a memory card or other package that houses one or more non-volatile read-only memories. The computer-readable medium 740 also may be a random access memory or other volatile re-writable memory. Additionally, the computer-readable medium 740 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application-specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the methods described herein and which, when loaded in a computer system, is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

From the foregoing, it may be seen that the embodiments disclosed herein provide an approach for optimizing the testing of computer systems. For example, metrics and dimensions for a system may be determined. Then the footprint of test scripts may be determined. The footprint may include dimension-effect values corresponding to the number of times a dimension is affected by a script. Next, target-dimension values corresponding to a desired number of times per period each dimension should be affected is specified. Then an LLS algorithm is utilized to determine the number of times to execute the script within the period so as to minimize the difference between the actual number of times dimensions are affected and the target-dimension values. Finally, the scripts are executed on the computer system the determined number of times within the time period. The computer system in turn exercises operations of other computer systems according to the scripts.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

I claim:

1. A method for testing a computer system, the method comprising:
   receiving script information that includes a dimension-effect value for each of multiple dimensions, each dimension-effect value corresponding to a number of times a dimension is affected by a script;
   receiving, based on user input, a target-dimension value for each of the multiple dimensions, each target-dimension value corresponding to a desired number of times per time period each dimension should be affected by the script;
   determining, by a processor and based on the dimension-effect value for each of the multiple dimensions and the target-dimension value for each of the multiple dimensions, a number of times to execute the script within the time period that minimizes a total error across the multiple dimensions, the total error accounting for differences between dimension-effect value and target-dimension value for each of the multiple dimensions; and
executing the script on the computer system the determined number of times within the time period.

2. The method according to claim 1, further comprising minimizing the total error across the multiple dimensions via a linear-least-squares algorithm.

3. The method according to claim 1, further comprising scaling at least one dimension-effect value and at least one target-dimension value by a weighting factor.

4. The method according to claim 3, wherein the weighting factor corresponds to the reciprocal of a highest of the target-dimension values.

5. The method according to claim 3, wherein the weighting factor corresponds to the reciprocal of an average of all of the target-dimension values.

6. The method according to claim 3, wherein the weighting factor corresponds to the reciprocal of a sum of all of the target-dimension values.

7. The method according to claim 1, further comprising multiplying at least one target-dimension value by a growth factor.

8. The method according to claim 1, wherein minimizing the total error across the multiple dimensions comprises determining a percentage of error and communicating the percentage of error to a display.

9. A non-transitory machine-readable storage medium having stored thereon a computer program comprising at least one code section for testing a computer system, the at least one code section being executable by a machine for causing the machine to perform acts of:
receiving script information that includes a dimension-effect value for each of multiple dimensions, each dimension-effect value corresponding to a number of times a dimension is affected by a script;
receiving, based on user input, a target-dimension value for each of the multiple dimensions, each target-dimension value corresponding to a desired number of times per time period each dimension should be affected by the script;
determining, based on the dimension-effect value for each of the multiple dimensions and the target-dimension value for each of the multiple dimensions, a number of times to execute the script within the time period that minimizes a total error across the multiple dimensions, the total error accounting for differences between dimension-effect value and target-dimension value for each of the multiple dimensions; and
executing the script on the computer system the determined number of times within the time period.

10. The machine-readable storage according to claim 9, wherein the code section is executable to cause the machine to minimize the total error via a linear-least-squares algorithm.

11. A system for testing a computer system, the system comprising:
a processor operable to receive script information that includes a dimension-effect value for each of multiple dimensions, each dimension-effect value corresponding to a number of times a dimension is affected by a script; receive, based on user input, a target-dimension value for each of the multiple dimensions, each target-dimension value corresponding to a desired number of times per time period each dimension should be affected by the script; determine, based on the dimension-effect value for each of the multiple dimensions and the target-dimension value for each of the multiple dimensions, a number of times to execute the script within the time period that minimizes a total error across the multiple dimensions, the total error accounting for differences between dimension-effect value and target-dimension value for each of the multiple dimensions; and execute the script on the computer system the determined number of times within the time period.

12. The system according to claim 11, wherein the processor is operable to minimize the total error via a linear-least-squares algorithm.

13. The system according to claim 11, wherein the processor is operable to scale at least one dimension-effect value and at least one target-dimension value by a weighting factor.

14. The system according to claim 13, wherein the weighting factor corresponds to the reciprocal of a highest of the target-dimension values.

15. The system according to claim 13, wherein the weighting factor corresponds to the reciprocal of an average of all of the target-dimension values.

16. The system according to claim 13, wherein the weighting factor corresponds to the reciprocal of a sum of all of the target-dimension values.

17. The system according to claim 11, wherein the processor is operable to multiply at least one target-dimension value by a growth factor.

18. The method of claim 1:
wherein receiving script information comprises receiving script information for multiple scripts with at least one dimension-effect value for each of the multiple scripts;
wherein determining the number of times to execute the script within the time period that minimizes the total error across the multiple dimensions comprises determining, by the processor, a load model for the multiple scripts that minimizes the total error across the multiple dimensions, the load model defining an execution rate for each of the multiple scripts; and
wherein executing the script on the computer system the determined number of times within the time period comprises executing the multiple scripts in accordance with the load model.

19. The method of claim 18:
wherein the multiple scripts are grouped in a manner that defines relationships between groups of the multiple scripts; and
wherein determining the load model for the multiple scripts that minimizes the total error across the multiple dimensions comprises constraining the load model to minimize the total error across the multiple dimensions while maintaining the relationships between the groups of the multiple scripts.

20. The method of claim 18, wherein determining the load model for the multiple scripts that minimizes the total error across the multiple dimensions comprises finding, by the processor, combinations of script execution rates for the multiple scripts that minimize the total error.

21. The method of claim 1, wherein minimizing the total error across the multiple dimensions comprises minimizing a summation of errors for each of the multiple dimensions while allowing a first error for a first dimension in the multiple dimensions to be higher than a second error for a second dimension in the multiple dimensions, thereby sacrificing the first dimension for the second dimension to better reduce the total error across the multiple dimensions.

22. The method of claim 1, wherein minimizing the total error across the multiple dimensions comprises minimizing the total error across the multiple dimensions without balancing error across the multiple dimensions.

23. The method of claim 1, wherein determining the number of times to execute the script within the time period that minimizes the total error across the multiple dimensions comprises:
applying a first weighting factor to values for a first dimension in the multiple dimensions;

applying a second weighting factor to values for a second dimension in the multiple dimensions, the second weighting factor being different than the first weighting factor; and determining, based on the weighted values for the first dimension and the weighted values for the second dimension, the number of times to execute the script within the time period that minimizes the total error across the multiple dimensions.

* * * * *

UNITED STATES PATENT AND TRADEMARK OFFICE
CERTIFICATE OF CORRECTION

PATENT NO. : 8,332,820 B2  
APPLICATION NO. : 12/261519  
DATED : December 11, 2012  
INVENTOR(S) : David M. Hummel, Jr.

It is certified that error appears in the above-identified patent and that said Letters Patent is hereby corrected as shown below:

Title Page, column 2, line 4, under "OTHER PUBLICATIONS", delete "Carneigie" and insert -- Carnegie --, therefor.

In the Claims

In Claim 10, column 17, line 51, delete "The machine-readable storage according to claim" and insert -- The machine-readable storage medium according to claim --, therefor.

Signed and Sealed this
Eighteenth Day of June, 2013

Teresa Stanek Rea
*Acting Director of the United States Patent and Trademark Office*